W. GRAHAM.
DEVICE TO PREVENT DOGS FROM WORRYING SHEEP.
APPLICATION FILED NOV. 14, 1911.
1,046,177. Patented Dec. 3, 1912.
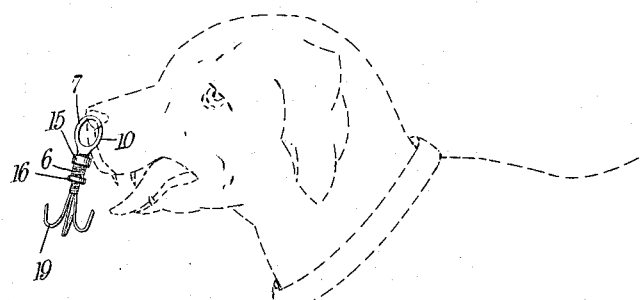
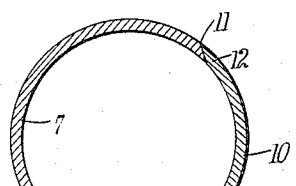
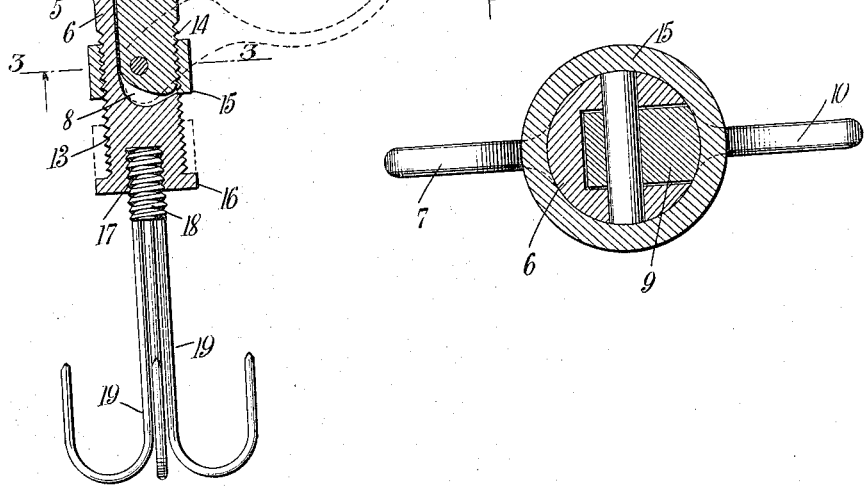
WITNESSES
C. J. Hackenberg.
J. B. Marshall
INVENTOR
William Graham
BY
ATTORNEYS

UNITED STATES PATENT OFFICE.

WILLIAM GRAHAM, OF COOKSHIRE, QUEBEC, CANADA.

DEVICE TO PREVENT DOGS FROM WORRYING SHEEP.

1,046,177.

Specification of Letters Patent. Patented Dec. 3, 1912.

Application filed November 14, 1911. Serial No. 660,248.

*To all whom it may concern:*

Be it known that I, WILLIAM GRAHAM, a subject of the King of Great Britain, and a resident of Cookshire, in the Province of Quebec and Dominion of Canada, have invented a new and Improved Device to Prevent Dogs from Worrying Sheep, of which the following is a full, clear, and exact description.
My invention relates to devices to prevent dogs from worrying sheep, and it has for its object to provide one which may be fastened to the nose of a dog, and which is provided with hooks which will become entangled in the wool of a sheep so that when the sheep starts to run the dog's nose will be pulled, and the dog will receive a lesson which will break him of his habit of worrying sheep.
Additional objects of the invention will appear in the following complete specification, in which the preferred form of the invention is disclosed.

In the drawings similar characters of reference indicate corresponding parts in all the views, in which—

Figure 1 is a view showing how the device is attached to the nose of a dog; Fig. 2 is a sectional view of the device; and Fig. 3 is a sectional view on the line 3—3 of Fig. 2.

By referring to the drawings it will be seen that a hook member 5 is provided, having a shank 6, and a bent arm 7. There is a recess 8 in the shank 6, and in this recess 8 there is pivoted the shank 9 of the bent arm 10, which coöperates with the bent arm 7, so that when the bent arm 7 is disposed through a portion of the nose of a dog, its terminal 11 will be engaged by the terminal 12 of the bent arm 10 to prevent the hook member 5 from becoming freed from the dog's nose. The shank 6 has a thread 13, and the shank 9 has a thread 14, which forms a continuation of the thread 13, so that the nut or collar 15, which meshes with the thread 13, may be disposed against the shank 9 at one side, and against the shank 6 at the other side, to hold the shank 9 in the recess 8 of the shank 7, so that the arm 10 will be disposed with its terminal 12 against the terminal 11 of the arm 7. The shank 6 is provided with an annular flange 16 to prevent the nut or collar 15 from becoming removed from the shank 6. In the shank 6 there is a threaded orifice 17, in which meshes a threaded stud 18, to which the hooks 19 are secured. It will therefore be seen that the hooks 19, with the stud 18, may be readily removed from the ring member 5 when desired.

When the hooks 19, with the stud 18, are secured to the ring member 5, which is attached to the nose of a dog, the hooks will become entangled in the wool of any sheep which the dog may attempt to worry. As soon as the dog is in close enough contact with the sheep to permit the hooks 19 to become entangled in the wool of the sheep, the sheep will start to run, which will yank the ring member 5, and give the dog's nose a severe pull, and, after a few attempts have been made in this way to worry the sheep, it will be found that the dog is very careful not to go too close to the sheep and that the sheep are no longer disturbed at the presence of the dog.

Having thus described my invention, I claim as new and desire to secure by Letters Patent:

1. In a device for preventing dogs from worrying sheep, a ring member adapted to be secured to the nose of a dog, and a hook rigidly secured to the ring member which will become entangled in the wool of any sheep that the dog may try to worry, so that when the sheep starts to run the ring member will pull the dog's nose.

2. In a device for preventing dogs from worrying sheep, a ring member adapted to be secured to the nose of a dog, and having a threaded orifice, and a hook having a threaded stud for meshing in the threaded orifice of the ring member.

3. In a device for preventing dogs from worrying sheep, a shank with an arm, a second shank pivoted to the first-mentioned shank and having an arm, a collar for engaging the shanks for holding the arms in position relatively to each other, and a hook rigidly secured to the first-mentioned shank.

4. In a device for preventing dogs from worrying sheep, a shank having an arm and a threaded orifice, a second shank pivoted to the first-mentioned shank, and having an arm, a collar for engaging the shanks for holding the arms in position relatively to each other, a threaded stud meshing in the threaded orifice, and a hook secured to the stud.

In testimony whereof I have signed my name to this specification in the presence of two subscribing witnesses.

WILLIAM GRAHAM.

Witnesses:
GEORGE AMOS FOX,
CHARLES SAWYER.